(12) United States Patent
McCormick et al.

(10) Patent No.: US 7,654,565 B2
(45) Date of Patent: Feb. 2, 2010

(54) GAS GENERATING SYSTEM

(75) Inventors: David M. McCormick, St. Clair Shores, MI (US); Robert M. Hardenburg, Lake Orion, MI (US); Bernardo V. Vergara, Romeo, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 117 days.

(21) Appl. No.: 11/445,859

(22) Filed: Jun. 1, 2006

(65) Prior Publication Data
US 2006/0273564 A1 Dec. 7, 2006

Related U.S. Application Data

(60) Provisional application No. 60/686,906, filed on Jun. 2, 2005.

(51) Int. Cl.
*B60R 21/26* (2006.01)
(52) U.S. Cl. .............. 280/736; 280/741; 422/164; 422/165; 422/166; 422/305
(58) Field of Classification Search ............. 280/736, 280/741; 422/164, 165, 166, 305
See application file for complete search history.

(56) References Cited

U.S. PATENT DOCUMENTS

| | | | |
|---|---|---|---|
| 1,939,700 A | 12/1933 | Hofstetter | 89/14.2 |
| 2,891,525 A | 6/1959 | Moore | 123/90.51 |
| 2,959,127 A | 11/1960 | Weinert | 102/368 |
| 3,794,347 A | 2/1974 | Zens | 280/150 |
| 3,877,882 A | 4/1975 | Lette et al. | |
| 3,880,447 A | 4/1975 | Thorn et al. | |
| 3,958,949 A | 5/1976 | Plantif et al. | |

(Continued)

FOREIGN PATENT DOCUMENTS

DE 40 19 877 A1 6/1990

(Continued)

OTHER PUBLICATIONS

U.S. Appl. No. 11/251,255.

(Continued)

*Primary Examiner*—Paul N. Dickson
*Assistant Examiner*—Barry Gooden, Jr.
(74) *Attorney, Agent, or Firm*—L. C. Begin & Associates, PLLC.

(57) ABSTRACT

A gas generating system for use in an inflatable vehicle occupant protection system is provided wherein an end closure is coupled to an outer housing at a first end, in a metal-to-metal seal. The gas generating system may also include a baffle system having a plurality of flow orifices defining a flow path for generated gases through an interior of the gas generating system, and a plurality of particulate aggregation surfaces positioned along the flow path of the gases for changing a flow direction of gases impinging on the aggregation surfaces. Each aggregation surface of the plurality of aggregation surfaces is oriented such that a difference between a flow direction of the gases prior to impinging on the aggregation surface and a flow direction of the gases after impinging on the aggregation surface is at least approximately 90°, wherein particulates in gases impinging on the aggregation surfaces aggregate on the surfaces.

13 Claims, 3 Drawing Sheets

U.S. PATENT DOCUMENTS

| | | | |
|---|---|---|---|
| 3,985,076 A | 10/1976 | Schneiter et al. | |
| 4,001,750 A | 1/1977 | Scherer et al. | 337/280 |
| 4,012,189 A | 3/1977 | Vogt et al. | 431/353 |
| 4,215,631 A | 8/1980 | Rucker | 102/27 |
| 4,276,065 A * | 6/1981 | Miko et al. | 96/394 |
| 4,530,516 A | 7/1985 | Adams et al. | 280/741 |
| 4,588,043 A | 5/1986 | Finn | 181/223 |
| 4,611,374 A | 9/1986 | Schnelle et al. | 29/890.13 |
| 4,722,551 A | 2/1988 | Adams | |
| 4,730,558 A | 3/1988 | Florin et al. | 102/218 |
| 4,762,067 A | 8/1988 | Barker et al. | 102/313 |
| 4,865,359 A * | 9/1989 | Roberts | 285/94 |
| 4,886,293 A | 12/1989 | Weiler et al. | |
| 4,950,458 A | 8/1990 | Cunningham | 422/164 |
| 5,028,070 A | 7/1991 | Bender | |
| 5,048,862 A | 9/1991 | Bender et al. | |
| 5,100,171 A | 3/1992 | Faigle et al. | 280/736 |
| 5,183,268 A * | 2/1993 | Wong et al. | 277/328 |
| 5,215,721 A | 6/1993 | Tasaki et al. | |
| 5,294,244 A | 3/1994 | Allerton, III et al. | 75/401 |
| 5,318,323 A | 6/1994 | Pietz | |
| 5,333,656 A | 8/1994 | Mackal | 141/330 |
| 5,340,150 A | 8/1994 | Harada et al. | |
| 5,350,193 A * | 9/1994 | Murashima et al. | 280/741 |
| 5,360,232 A * | 11/1994 | Lowe et al. | 280/741 |
| 5,372,449 A | 12/1994 | Bauer et al. | 403/273 |
| 5,387,009 A | 2/1995 | Lauritzen et al. | |
| 5,406,889 A | 4/1995 | Letendre et al. | |
| 5,443,286 A | 8/1995 | Cunningham et al. | |
| 5,466,420 A | 11/1995 | Parker et al. | |
| 5,509,686 A | 4/1996 | Shepherd et al. | 280/738 |
| 5,516,147 A | 5/1996 | Clark et al. | 280/737 |
| 5,533,751 A | 7/1996 | Kort et al. | 280/737 |
| 5,551,724 A * | 9/1996 | Armstrong et al. | 280/737 |
| 5,556,439 A | 9/1996 | Rink et al. | 55/487 |
| 5,562,304 A | 10/1996 | Gest | |
| 5,564,743 A | 10/1996 | Marchant | 280/741 |
| 5,582,427 A | 12/1996 | Rink et al. | 280/740 |
| 5,588,676 A | 12/1996 | Clark et al. | 280/741 |
| 5,609,360 A | 3/1997 | Faigle et al. | 280/740 |
| 5,611,566 A | 3/1997 | Simon et al. | 280/736 |
| 5,613,703 A | 3/1997 | Fischer | 280/741 |
| 5,622,380 A | 4/1997 | Khandhadia et al. | 280/736 |
| 5,624,133 A | 4/1997 | Wong | |
| 5,624,134 A | 4/1997 | Iwai et al. | |
| 5,628,528 A | 5/1997 | DeSautelle et al. | 280/736 |
| 5,630,619 A | 5/1997 | Buchanan et al. | 280/741 |
| 5,648,634 A * | 7/1997 | Avory et al. | 102/202.1 |
| 5,662,722 A | 9/1997 | Shiban | 55/413 |
| 5,702,494 A | 12/1997 | Tompkins et al. | 55/498 |
| 5,725,245 A | 3/1998 | O'Driscoll et al. | |
| 5,799,973 A | 9/1998 | Bauer et al. | 280/741 |
| 5,813,695 A | 9/1998 | O'Driscoll et al. | |
| 5,829,784 A * | 11/1998 | Brown et al. | 280/737 |
| 5,829,785 A | 11/1998 | Jordan et al. | 280/741 |
| 5,845,935 A | 12/1998 | Enders et al. | 280/743.2 |
| 5,851,027 A * | 12/1998 | DiGiacomo et al. | 280/736 |
| 5,860,672 A | 1/1999 | Petersen | 280/728.2 |
| 5,872,329 A | 2/1999 | Burns et al. | 149/36 |
| 5,890,735 A * | 4/1999 | Smith | 280/737 |
| 5,934,705 A | 8/1999 | Siddiqui et al. | 280/736 |
| 5,941,562 A | 8/1999 | Rink et al. | 280/741 |
| 6,019,389 A | 2/2000 | Burgi et al. | 280/736 |
| 6,032,979 A | 3/2000 | Mossi et al. | 280/741 |
| 6,068,292 A * | 5/2000 | Renz | 280/737 |
| 6,074,502 A | 6/2000 | Burns et al. | |
| 6,095,556 A | 8/2000 | Bailey et al. | 280/737 |
| 6,095,559 A | 8/2000 | Smith et al. | |
| 6,095,561 A | 8/2000 | Siddiqui et al. | 280/472 |
| 6,106,000 A | 8/2000 | Stewart | 280/728.2 |
| 6,116,491 A | 9/2000 | Kutoh | 228/42 |
| 6,210,505 B1 | 4/2001 | Khandhadia et al. | 149/36 |
| 6,244,623 B1 | 6/2001 | Moore et al. | 280/471 |
| 6,306,232 B1 * | 10/2001 | Khandhadia et al. | 149/22 |
| 6,379,627 B1 | 4/2002 | Nguyen et al. | |
| 6,464,254 B2 | 10/2002 | Chikaraishi et al. | 280/741 |
| 6,474,684 B1 | 11/2002 | Ludwig et al. | |
| 6,485,051 B1 | 11/2002 | Taguchi et al. | |
| 6,581,963 B2 | 6/2003 | Mangun | 280/741 |
| 6,620,266 B1 * | 9/2003 | Williams et al. | 149/3 |
| 6,709,012 B1 | 3/2004 | Tanaka et al. | |
| 6,764,096 B2 | 7/2004 | Quioc | |
| 6,776,434 B2 | 8/2004 | Ford et al. | 280/729 |
| 6,799,776 B2 * | 10/2004 | Yamazaki | 280/737 |
| 6,846,014 B2 | 1/2005 | Rink et al. | 280/740 |
| 6,851,705 B2 | 2/2005 | Young et al. | |
| 6,860,510 B2 * | 3/2005 | Ogawa et al. | 280/736 |
| 6,871,873 B2 | 3/2005 | Quioc et al. | 280/741 |
| 6,908,104 B2 | 6/2005 | Canterbery et al. | 280/736 |
| 6,929,284 B1 | 8/2005 | Saso et al. | |
| 6,935,655 B2 | 8/2005 | Longhurst et al. | 280/736 |
| 6,945,561 B2 | 9/2005 | Nakashima et al. | |
| 6,948,737 B2 | 9/2005 | Ohji et al. | |
| 6,976,704 B2 * | 12/2005 | Lewis et al. | 280/741 |
| 7,059,635 B2 * | 6/2006 | Ryobo et al. | 280/741 |
| 7,073,820 B2 | 7/2006 | McCormick | 280/741 |
| 7,125,042 B2 * | 10/2006 | Adamini et al. | 280/736 |
| 7,137,339 B2 * | 11/2006 | Bierwirth et al. | 102/202 |
| 7,178,830 B2 | 2/2007 | Blackburn | 280/736 |
| 7,237,801 B2 | 7/2007 | Quioc et al. | 280/736 |
| 7,267,365 B2 | 9/2007 | Quioc | 280/736 |
| 7,390,019 B2 | 6/2008 | Gotoh et al. | 280/141 |
| 7,506,891 B2 * | 3/2009 | Quioc et al. | 280/741 |
| 2002/0053789 A1 | 5/2002 | Fujimoto | |
| 2002/0190510 A1 * | 12/2002 | Yamazaki | 280/736 |
| 2003/0001369 A1 * | 1/2003 | Iwai et al. | 280/741 |
| 2003/0127840 A1 | 7/2003 | Nakashima et al. | |
| 2003/0155757 A1 | 8/2003 | Larsen et al. | |
| 2003/0201628 A1 | 10/2003 | Choudhury et al. | 280/729 |
| 2004/0016480 A1 * | 1/2004 | Williams et al. | 149/46 |
| 2004/0046373 A1 | 3/2004 | Wang et al. | |
| 2004/0100079 A1 * | 5/2004 | Yamazaki et al. | 280/741 |
| 2004/0201208 A1 * | 10/2004 | Longhurst et al. | 280/741 |
| 2005/0001414 A1 | 1/2005 | Matsuda et al. | |
| 2005/0046180 A1 * | 3/2005 | Tombler et al. | 285/95 |
| 2005/0067794 A1 * | 3/2005 | Gambier | 277/566 |
| 2005/0082804 A1 * | 4/2005 | Khandhadia | 280/736 |
| 2005/0134031 A1 | 6/2005 | McCormick | 280/741 |
| 2005/0161925 A1 | 7/2005 | Blackburn | |
| 2005/0194772 A1 | 9/2005 | Numoto et al. | |
| 2005/0225064 A1 * | 10/2005 | Suehiro et al. | 280/741 |
| 2005/0230949 A1 | 10/2005 | Blackburn | 280/736 |
| 2005/0263993 A1 | 12/2005 | Blackburn | |
| 2005/0263994 A1 | 12/2005 | Quioc | 280/741 |
| 2005/0272873 A1 * | 12/2005 | Miller et al. | 525/204 |
| 2005/0280252 A1 | 12/2005 | McCormick | |
| 2006/0005734 A1 | 1/2006 | McCormick | |
| 2006/0043716 A1 | 3/2006 | Quioc | |
| 2006/0082112 A1 | 4/2006 | Blackburn | 280/736 |
| 2006/0157961 A1 * | 7/2006 | Burns | 280/736 |
| 2006/0261584 A1 | 11/2006 | Blackburn | 280/741 |
| 2007/0001438 A1 | 1/2007 | Patterson et al. | 280/740 |
| 2008/0118408 A1 | 5/2008 | Numoto et al. | 422/167 |

FOREIGN PATENT DOCUMENTS

| | | |
|---|---|---|
| EP | 0602785 B1 | 10/1993 |
| EP | 0728633 A1 | 2/1996 |
| EP | 0844149 A1 | 11/1997 |
| EP | 1122134 B1 | 7/2000 |
| EP | 1308353 A2 | 9/2002 |
| JP | 04055151 A | 2/1992 |
| JP | 05096147 | 4/1993 |
| JP | 05178155 A | 7/1993 |

| | | | |
|---|---|---|---|
| JP | 05178156 A | 7/1993 | |
| JP | 06227358 A | 8/1994 | |
| WO | WO 98/39183 | 9/1998 | |
| WO | WO 2004/091982 A1 | 10/2004 | |
| WO | WO 2005035312 A2 * | 4/2005 | |
| WO | WO 2005/058645 A2 | 6/2005 | |
| WO | WO 2005/086917 | 9/2005 | |
| WO | WO 2006/044516 A2 | 4/2006 | |
| WO | WO 2006/078819 A2 | 7/2006 | |

OTHER PUBLICATIONS

U.S. Appl. No. 11/358,786.

Office Action U.S. Appl. No. 11/479,494, filed Jun. 30, 2006 dated for May 15, 2009 (128).

Office Action U.S. Appl. No. 11/167,849 filed Jun. 27, 1995 dated for Jun. 24, 2009 (88).

Office Action U.S. Appl. No. 11/358,786 filed Feb. 21, 2006 dated for Mar. 21, 2008.

Office Action U.S. Appl. No. 11/358,786 filed Feb. 21, 2006 dated for Sep. 18, 2008.

Office Action U.S. Appl. No. 11/479,494 filed Jun. 30, 2006 dated for Nov. 12, 2008.

Office Action U.S. Appl. No. 11/167,849 filed Jun. 27, 2005 dated for Oct. 17, 2008.

Office Action for U.S. Appl. No. 11/140,055 filed May 27, 2005 dated for Apr. 20, 2007.

Office Action for U.S. Appl. No. 11/140,055 filed May 27, 2005 dated for Dec. 12, 2007.

Office Action for U.S. Appl. No. 11/167,849 filed Jun. 27, 2005 dated for Jan. 14, 2008.

* cited by examiner

GAS GENERATING SYSTEM

CROSS REFERENCE TO RELATED APPLICATIONS

This application claims the benefit of provisional application Ser. No. 60/686,906, filed on Jun. 2, 2005.

BACKGROUND OF THE INVENTION

The present invention relates generally to gas generating systems and, more particularly, to filterless gas generating systems for use in applications such as inflatable occupant restraint systems in motor vehicles.

Installation of inflatable occupant protection systems as standard equipment in all new vehicles has intensified the search for smaller, lighter and less expensive protection systems. Accordingly, since the inflation gas generator used in such protection systems tends to be the heaviest and most expensive component, there is a need for a lighter, more compact, and less expensive gas generating system.

A typical gas generating system includes cylindrical steel or aluminum housing having a diameter and length related to the vehicle application and characteristics of a gas generant composition contained therein. Because inhalation by a vehicle occupant of particulates generated by gas generant combustion during airbag activation can be hazardous, it is desirable to remove particulate material, or slag, produced during combustion of the gas generant. Thus, the gas generating system is generally provided with an internal or external filter comprising one or more layers of steel screen of varying mesh and wire diameter. Gas produced upon combustion of the gas generant passes through the filter before exiting the gas generating system. In a conventional system, the particulates are substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into an associated airbag. However, inclusion of the filter in the gas generating system increases the complexity, weight, and expense of the gas generating system. Thus, a gas generating system construction which removes particulates and cools the generated gases without the need for a filter is desirable.

Variations in the filter components and in the arrangement of the filter material can also unpredictably and adversely affect gas flow through the filter, thereby contributing to ballistic variability of the gas generating system and making the system response less predictable.

Yet another concern involves reducing the size of the inflator thereby reducing the packaging size and providing greater design flexibility in various applications or uses. Furthermore, reducing the size of the inflator reduces the raw material requirements, and may also advantageously reduce the manufacturing complexity, thereby reducing overall manufacturing costs.

Other ongoing concerns with gas generating systems include the ability to achieve any one of a variety of ballistic profiles by varying as few of the physical parameters of the gas generating system as possible and/or by varying these physical parameters as economically as possible.

SUMMARY OF THE INVENTION

The above-referenced concerns may be mitigated or obviated by providing a gas generating system for use in an inflatable vehicle occupant protection system, a system that may if desired be filterless. In one aspect, the gas generating system includes a baffle system having a plurality of flow orifices defining a flow path for generated gases through an interior of the gas generating system, and a plurality of particulate aggregation surfaces positioned along the flow path of the gases for changing a flow direction of gases impinging on the aggregation surfaces. Each aggregation surface is oriented such that a difference between a flow direction of the gases prior to impinging on the aggregation surface and a flow direction of the gases after impinging on the aggregation surface is at least approximately 90°, wherein particulates in gases impinging on the aggregation surfaces aggregate or collect on the surfaces.

In another aspect of the invention, the gas generating system includes an outer housing including a combustion chamber, a baffle system, and may also include a high gas-yield, low solids-producing gas generant composition positioned in the combustion chamber. The baffle system includes a plurality of flow orifices defining a flow path for gases generated by combustion of the gas generant composition, the flow path extending between the combustion chamber and an exterior of the gas generating system, and a plurality of particulate aggregation surfaces positioned along the flow path of the gases for changing a flow direction of gases impinging on the aggregation surfaces, wherein particulates in gases impinging on the aggregation surfaces aggregate on the surfaces.

In yet another aspect of the present invention, the present inflator includes an end closure that is cold-worked or otherwise compressed within an outer housing, the end closure containing a body bore groove, and the housing or outer tube containing a flange pressed within the groove, thereby providing a body bore seal in a metal to metal contact. Stated another way, the present invention includes an inflator housing having a first end and a second end, the housing coupled to an end closure at the first end in a metal-to-metal seal.

DETAILED DESCRIPTION

The present invention broadly comprises a gas generating system that is fabricated without the wire mesh filter required in earlier designs for removing particulate materials from a stream of inflation gas. The design utilizes a tortuous path gas flow concept to cool the gas and to retain solids in the device in order to minimize flame and particulates from exiting the device. Selection of suitable gas generant compositions capable of combusting to produce inflation gas without an undue quantity of particulates further obviates the need for a filter. Obviating the need for a filter enables the gas generating system to be simpler, lighter, less expensive, and easier to manufacture.

Figure 1:
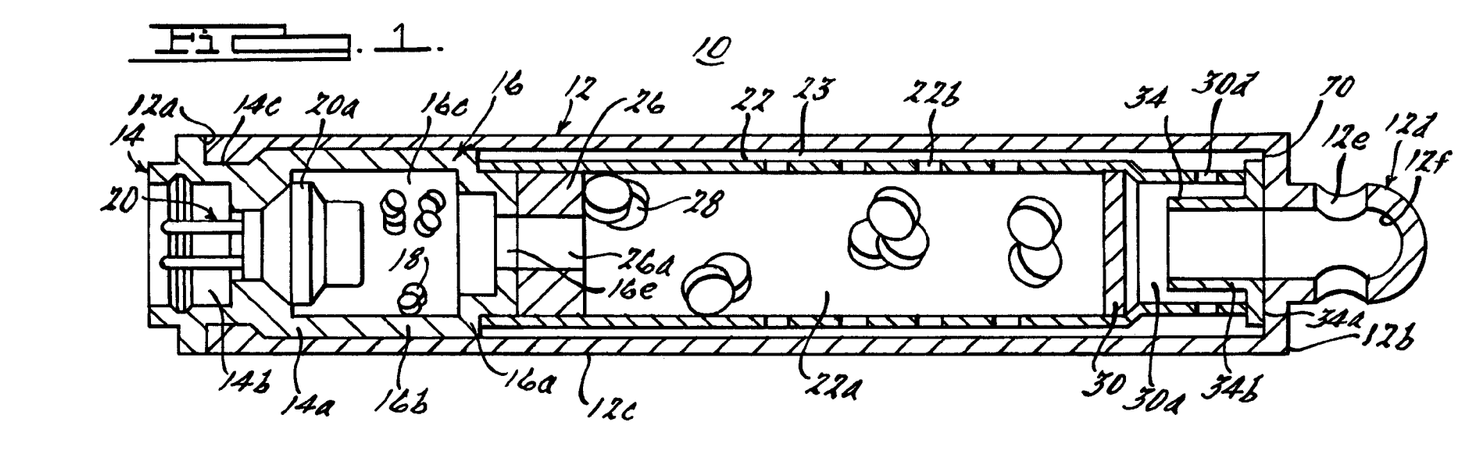
FIG. 1 is a cross-sectional side view of a first embodiment of a gas generating system in accordance with the present invention.

FIG. 1 shows one embodiment of a gas generating system 10 in accordance with the present invention. Gas generating system 10 is generally constructed of components made from a durable metal such as carbon steel or iron, but may also include components made from tough and impact-resistant polymers, for example. One of ordinary skill in the art will appreciate various methods of construction for the various components of the inflator. U.S. Pat. Nos. 5,035,757, 6,062, 143, 6,347,566, U.S. Patent Application Serial No. 2001/0045735, WO 01/08936, and WO 01/08937 exemplify typical designs for the various inflator components, and are incorporated herein by reference in their entirety, but not by way of limitation.

Referring to FIG. 1, gas generating system 10 includes a substantially cylindrical outer housing 12 having a first end 12a, a second end 12b opposite the first end, and a wall 12c extending between the ends to define a housing interior cavity. Outer housing 12 is made from a metal or metal alloy and may be a cast, stamped, deep-drawn, extruded, or otherwise metal-formed. A nozzle 12d is formed at housing second end 12b containing one or more gas exit orifices 12e for enabling fluid communication between an interior of the housing and an associated inflatable device (for example, an airbag or a safety belt pretensioner incorporated into a vehicle occupant protection system.) In the embodiment shown in FIG. 1, outer housing 12 and nozzle 12d are deep drawn as a single piece. Gas exit orifice(s) 12e are then provided in outer housing second end 12b by drilling, punching, or other suitable means.

In a particular embodiment, the gas generating system is a micro gas generator with outer housing 12 having an outer diameter of approximately 20 mm, usable in, for example, a side seat inflator or a safety belt pretensioner. However, the characteristics of the embodiments described herein may be incorporated into gas generating systems of many alternative sizes, usable for a variety of different applications.

In an alternative embodiment (not shown), the gas exit orifices may be incorporated into a gas exit manifold which is formed separately from the outer housing and then welded or otherwise suitably fixed to the outer housing during assembly of the gas generating system.

In another alternative embodiment (not shown), a small quantity of a filter material may be incorporated into the outer housing second end proximate the gas exit orifices to filter combustion products from the inflation fluid prior to gas distribution. Any suitable metallic mesh filter or woven wire cloth may be used, many examples of which are known and obtainable from commercially available sources (for example, Wayne Wire Cloth Products, Inc. of Bloomfield Hills, Mich.)

Figure 4:
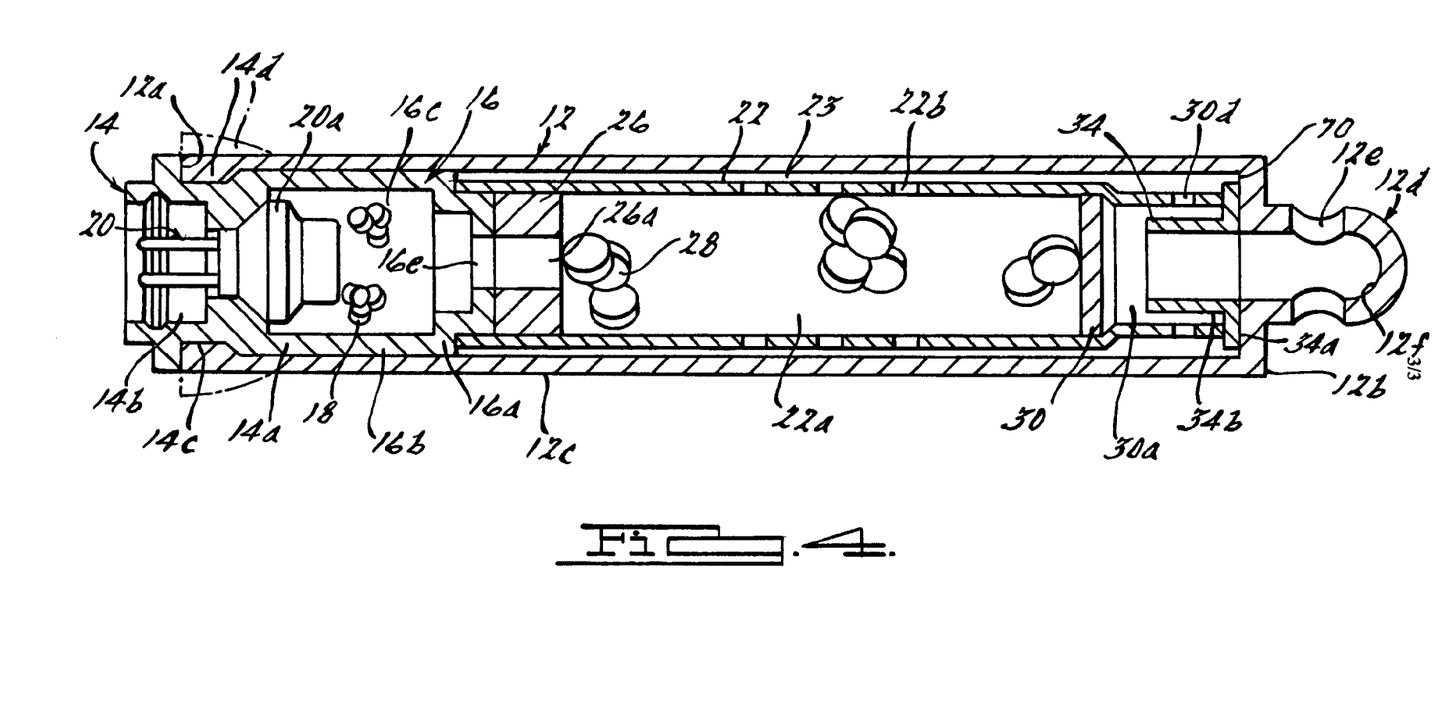
FIG. 4 is a cross-sectional side view of a first embodiment of a gas generating system in accordance with the present invention, wherein an annular flange or flare is shown as formed about the periphery of the outer housing prior to compressing within a recessed portion or groove formed within an end closure within the outer housing.

In accordance with the present invention, and as exemplified in FIG. 4, an end closure 14 is cold-worked or otherwise metal-formed within outer housing first end 12a. End closure 14 has formed therealong a peripheral shoulder 14a, a central orifice 14b, and a peripheral cavity or recessed portion 14c. In accordance with the present invention, an annular flange or protrusion 14d of housing first end 12a (shown as a dotted line in a pre-cold-worked state in FIG. 4, and also shown as compressed within the groove 14c), is drawn through a die to cold-work and thereby compress the flange within the groove 14c. Other known metal-forming methods may also be employed. The diameter of the inflator may be effectively reduced by eliminating the need for a typical seal such as an o-ring at the end closure and outer housing interface within groove 14c, and also by compressing the annular flange 14d within groove 14c. It will be appreciated that the volume of the annular flange or protruding portion 14d is at least approximately or substantially equal to the volume defined by the groove 12c. Accordingly, a flush metal-to-metal contact is formed at the interface of groove 14c and flange 14d once the substantially assembled inflator is drawn and compressed through a die having a smaller diameter than the outer diameter of the annular flange 14d prior to cold-working. By cold-working the outer tube or housing 12 to fit within groove 14c, the housing 12 is compressed to provide sufficient strength in accordance with customer specifications while simplifying the manufacturing process by reducing surface treatment or assembly of additional parts such as an o-ring. As shown in the embodiment shown in FIG. 1, the portion 14d of outer housing first end 12a is pressed into peripheral cavity 14c to secure the end closure to outer housing 12 and at the same time provide hermetic sealing of the inflator.

The cold-work technique of fitting and sealing the end closure 14 within the housing end 12a results in the ability to substantially reduce the diameter of the inflator to less than one inch outer diameter, while yet retaining the structural and other design requirements surrounding the shorting clip or ignition assembly, as determined by the customer. One embodiment exhibits an outer diameter of approximately 20 millimeters, thereby decreasing the packaging size and also increasing the design flexibility with regard to the particular application, as a side inflator within a seat for example.

Peripheral shoulder 14a is configured so that an end portion a wall 16b of an ignition cup 16 (described in greater detail below) having a predetermined outer diameter may be positioned to abut shoulder 14a. End closure 14 may be stamped, extruded, die cast, or otherwise metal formed and may be made from carbon steel or stainless steel, for example. Although not required, if desired, an O-ring or seal (not shown) may be seated along an outer edge of end closure 14 to seal the interface between the end closure 14 and housing wall 12c.

Referring again to FIG. 1, an ignition cup 16 is positioned adjacent end closure 14, and is nested within outer housing 12 for a portion of the housing length. Ignition cup 16 has a base portion 16a and an annular wall 16b extending from the base portion to abut end closure 14. Base portion 16a and wall 16b define a cavity 16c for containing a pyrotechnic compound 18 (for example, a known booster composition) therein. At least one ignition gas exit orifice 16e is formed in ignition cup 16 for release of ignition compound combustion products when ignition compound 18 is ignited. An annular recess is formed in base portion 16a and is dimensioned so that an end portion of an annular inner housing 22 (described below) having a predetermined inner diameter may be positioned within the recess to aid in locating and securing inner housing 22 within outer housing 12. Ignition cup 16 may be stamped, extruded, die cast, or otherwise metal formed and may be made from carbon steel or stainless steel, for example.

In the embodiment shown in FIG. 1, a rupturable, fluid-tight seal (not shown) is positioned across ignition cup orifice 16e to fluidly isolate cavity 16c from a main combustion chamber 22a formed downstream of ignition cup 16, prior to activation of the gas generating system. The seal is secured to a face of ignition cup base portion 16a and forms a fluid-tight barrier between cavity 16c and main combustion chamber 22a. Various known disks, foils, films, tapes, or other suitable materials may be used to form the seal.

Referring again to FIG. 1, a quantity of a pyrotechnic compound 18 is contained within cavity 16c. In the embodiment shown in FIG. 1, pyrotechnic compound 18 is a known or suitable ignition or booster compound, whose combustion ignites a second, main gas generant charge 28 positioned in combustion chamber 22a. In an alternative embodiment, pyrotechnic compound 18 in cavity 16c comprises the main gas generant charge for the gas generating system. This alternative embodiment may be used in applications in which a relatively small amount of inflation gas (and, therefore, a correspondingly smaller amount of gas generant) is needed. One or more autoignition tablets (not shown) may be placed in cavity 16c, allowing ignition of pyrotechnic compound 18 upon external heating in a manner well-known in the art.

Referring again to FIG. 1, an igniter assembly 20 is positioned and secured within end closure central orifice 14b so as to enable operative communication between cavity 16c containing ignition compound 18 and an igniter 20a incorporated into the igniter assembly, for igniting ignition compound 18 upon activation of the gas generating system. Igniter assembly 20 may be secured in central orifice 14b using any one of several known methods, for example, by welding, crimping, using an interference fit, or by adhesive application. An igniter assembly suitable for the application described herein may be obtained from any of a variety of known sources, for example Primex Technologies, Inc. of Redmond, Wash. or Aerospace Propulsion Products bv, of The Netherlands.

The recess in ignition cup 16 is adapted to accommodate a first end portion of an inner housing 22 therealong. In the embodiment of the gas generating system shown in FIG. 1, inner housing 22, in combination with center plate 26 and bulkhead 30 (described below) define a main combustion chamber 22a containing a main gas generant composition 28 (described in greater detail below.) Inner housing 22 is spaced apart from outer housing wall 12c to form an annular gas flow passage 23 extending between inner housing 22 and outer housing 12. Inner housing 22 includes at least one and preferably a plurality of gas exit apertures 22b formed therealong to enable fluid communication between combustion chamber 22a and gas flow passage 23. Upon activation of the gas generating system, combustion chamber 22a fluidly communicates with ignition cup cavity 16c by way of ignition cup orifice 16e.

In the embodiment shown in FIG. 1, inner housing 22 telescopes or tapers down from a first, relatively larger inner diameter enclosing center plate 26 (described below) and combustion chamber 22a, to a second, relatively narrower inner diameter proximate outer housing second end 12b. Thus, the width of gas flow passage 23 (defined as half of the difference between an inner diameter of outer housing 12 and an outer diameter of inner housing 22, where inner housing is positioned coaxially with outer housing 12) may vary along the length of inner housing 22. In a particular embodiment, the width of gas flow passage 23 varies along the length of inner housing 22 from between a low-end value of approximately 0.5 mm. to a high-end value of approximately 3 mm. A second end of inner housing 22 includes an end portion which is rolled inwardly to form an annular orifice.

Inner housing 22 also has at least one second orifice 30d formed along the relatively narrow diameter portion of the inner housing to enable fluid communication between gas flow passage 23 and an interior of a baffle member 34 (described in greater detail below).

In an alternative embodiment 110 of the gas generating system (shown in FIG. 2), a second end portion of inner housing 122 is formed without the reduction in diameter and is seated along a recess formed in a baffle element 40 (described below), thereby positioning and securing inner housing 122 radially inwardly from outer housing 12. Thus, in this embodiment, the width of gas flow passage 23 is substantially constant along the length of inner housing 122. In a particular embodiment, the width of gas flow passage 23 is approximately 1 mm. along the length of inner housing 22.

Inner housings 22 and 122 may be extruded, deep drawn, or otherwise metal-formed from a metal or metal alloy.

Referring to FIG. 1, a perforate center plate 26 is press fit or otherwise suitably secured within housing 12. In the embodiment shown in FIG. 1, center plate 26 is dimensioned so as to form an interference fit with inner housing 22 and is positioned to abut base portion 16a of ignition cup 16. At least one orifice 26a is provided in center plate 26 to enable fluid communication between gas exit orifice 16e in ignition cup 16 and gas generant combustion chamber 22a formed in inner housing 22. Center plate 26 is made from a metal or metal alloy and may be a cast, stamped, drawn, extruded, or otherwise metal-formed. A rupturable, fluid-tight seal (not shown) may be positioned across orifice(s) 26a to fluidly isolate booster cavity 16c from combustion chamber 22a prior to activation of the gas generating system. The seal is secured to a face of center plate 26 and forms a fluid-tight barrier between ignition cup cavity 16c and combustion chamber 22a. Various known disks, foils, films, tapes, or other suitable materials may be used to form the seal.

Referring again to FIG. 1, gas generant composition 28 is positioned within combustion chambers 22a. It has been found that the gas generator embodiments described herein operate most favorably with a high gas-yield, low solids-producing gas generant composition, such as a "smokeless" gas generant composition. Such gas generant compositions are exemplified by, but not limited to, compositions and processes described in U.S. Pat. Nos. 6,210,505, and 5,872,329, each incorporated by reference herein. As used herein, the term "smokeless" should be generally understood to mean such propellants as are capable of combustion yielding at least about 85% gaseous products, and preferably about 90% gaseous products, based on a total product mass; and, as a corollary, no more than about 15% solid products and, preferably, about 10% solid products, based on a total product mass. U.S. Pat. No. 6,210,505 discloses various high nitrogen nonazide gas compositions comprising a nonmetal salt of triazole or tetrazole fuel, phase stabilized ammonium nitrate (PSAN) as a primary oxidizer, a metallic second oxidizer, and an inert component such as clay or mica. U.S. Pat. No. 5,872,329 discloses various high nitrogen nonazide gas compositions comprising an amine salt of triazole or tetrazole fuel, and phase stabilized ammonium nitrate (PSAN) as an oxidizer.

In the embodiment shown in FIG. 1, a bulkhead or divider 30 is press-fit, roll-crimped, or otherwise suitably secured within inner housing 12 along the reduced-diameter portion of the inner housing, so as to maintain the divider in position within the housing when the divider is subjected to gas pressures acting on either side of the divider. Bulkhead 30 partitions inner housing 22 to define a chamber 30a within inner housing proximate the outer housing second end. The portion of inner housing enclosing chamber 30a includes apertures 30d formed therein to enable fluid communication between gas flow passage 23 and chamber 30a. A gas-tight seal is affected between divider 30 and inner housing 22, thereby preventing leakage of gas from combustion chamber 22a toward gas exit nozzle 12d without transiting annular gas flow passage 23, as described below. Divider 30 may be formed by stamping, casting, or any other suitable process from a metal or metal alloy.

Referring again to FIG. 1, a baffle member 34 is provided for channeling a flow of gas entering inner housing 22 from gas flow passage 23 into gas exit nozzle 12d. Baffle member 34 includes an annular base portion 34a and an annular sleeve 34b extending from the base portion into inner housing 22 to define a baffle member interior in fluid communication with the gas flow passage 23. The baffle member interior is also in fluid communication with an interior of nozzle 12d. Base portion 34a is positioned and secured between a second end portion of inner housing 22 and outer housing gas exit nozzle 12d to secure the baffle member within housing 12. A rupturable, fluid-tight seal (not shown) may be positioned across an end portion of annular sleeve portion 34b to fluidly isolate inner housing end chamber 30a from outer housing gas exit nozzle 16d. Various known disks, foils, films, tapes, or other suitable materials may be used to form the seal.

In an alternative embodiment (shown in FIG. 2), a baffle member 40 includes a substantially circular base portion 40a abutting inner housing 22, and a substantially cylindrical wall 40b extending from base portion 40a. Wall 40b is in fluid communication with gas flow passage 23. Base portion 40a and wall 40b combine to define a baffle chamber 40c for receiving therein combustion products from combustion of inflation gas generant 28 in combustion chamber 22a, in a manner described below. Baffle chamber 40c is also in fluid communication with nozzle 12. A gas-tight seal is affected between baffle member base portion 40a and inner housing 22, thereby preventing leakage of gas from combustion chamber 22a toward gas exit nozzle 12d without transiting annular gas flow passage 23. A recess is formed in baffle member base portion 40a for receiving therealong the second end portion of inner housing 22, for positioning and securing the inner housing second end within the gas generating system. At least one (and preferably a plurality) of orifices 40d is formed in wall 40b for enabling flow of combustion products received from gas flow passage 23. In the embodiment shown in FIG. 2, several orifices 40d are spaced apart approximately 90° along a periphery of wall 40b. A rupturable, fluid-tight seal (not shown) may positioned across an entrance to gas exit nozzle 12d to fluidly isolate baffle chamber 40c from outer housing gas exit nozzle 12d. Various known disks, foils, films, tapes, or other suitable materials may be used to form the seal.

Particulates (especially the heavier particulates) suspended in the generated gases will have greater momentum and dynamic inertia than the gases in which they are suspended, and do not change direction as readily as the gases. Thus, the particulates will tend to collide with and aggregate upon surfaces along the gas flow path. It is also desirable to provide sufficient aggregation surface area at or near the portions of the gas generator interior where the particulates are likely to aggregate, in order to accommodate the aggregation of particulates. In addition, the more numerous the changes in direction in the gas flow, the more opportunities are provided for aggregation of the particulates.

It is believed that the particulates are most likely to aggregate upon surfaces on which they impinge with a relatively high velocity and/or on surfaces which produce a relatively severe change in direction of the gas flow. In one embodiment, this is achieved by providing aggregation surfaces oriented such that a difference between a flow direction of the gases prior to impinging on an aggregation surface and a flow direction of the gases after impinging on the aggregation surface is at least approximately 90°. In a particular embodiment of the present invention, each aggregation surfaces of the plurality of aggregation surfaces is substantially perpendicular to the flow direction of the gases impinging on the respective aggregation surface. Thus, at least a portion of the particulates striking the aggregation surfaces adhere to the surfaces, or aggregate on the surfaces, rather than changing direction with the remainder of the gas flow.

To maximize the probability of aggregating the particulates along the internal surfaces of the gas generator, it is desirable to maximize the number of collisions with the internal surfaces (and thus, the number of changes in direction of the gases), the velocity at which the particulates impact the internal surfaces, and the severity of changes of direction (more severe changes in gas flow direction of making it more likely that the particulates will temporarily stop, or that their velocity will be drastically reduced when they impinge upon an aggregation surface).

Figure 1A:
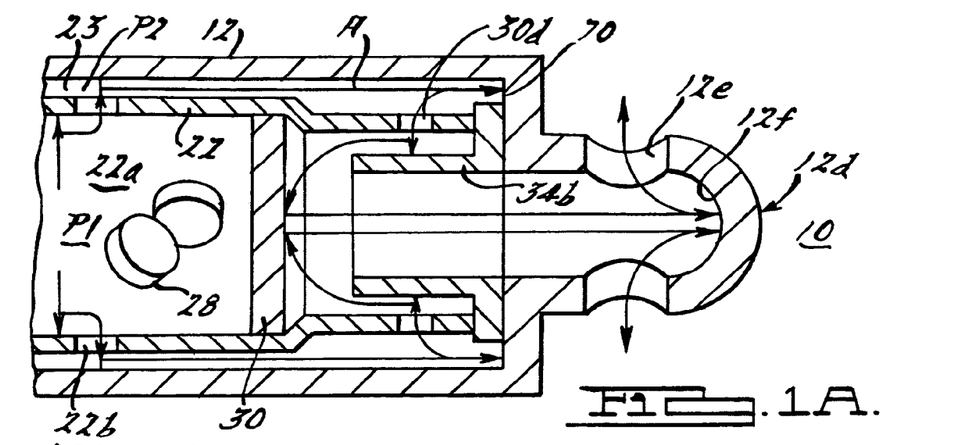
FIG. 1A is an enlarged view of a portion of FIG. 1 showing projected gas flow paths and projected particulate aggregation surfaces therealong.

FIG. 1A shows a projected gas flow path (indicated by arrows A) through the gas generating system when combustion of the gas generant begins. Referring to FIG. 1, it may be seen that orifices 22b, 30d, and the opening into annular sleeve 34b define a flow path for generated gases through an interior of the gas generating system to nozzle gas exit orifices 12e. In addition, the arrangement of the various gas generating system components described above provides a plurality of particulate aggregation surfaces positioned along the flow path of the gases for changing a flow direction of gases impinging on the surfaces, so that particulates in gases impinging on the aggregation surfaces will collect or aggregate on the surfaces.

In operation of the embodiment shown in FIGS. 1 and 1A, upon receipt of a signal from a crash sensor, an electrical activation signal is sent to igniter 20a. Combustion products from the igniter expand into ignition cup cavity 16c, igniting booster compound 18 positioned in cavity 16c. Products from the combustion of booster compound 18 proceed out of cavity 16c through ignition cup orifice 16e and into combustion chamber 22a, igniting main gas generant 28. When the main gas generant 28 has been fully ignited by the booster composition, the main gas generant begins to change phase from a solid to a liquid, then to a gas.

Gases and other combustion products generated by combustion of gas generant 28 are forced radially outward at a relatively high velocity toward gas exit apertures 22b by the internal pressure in inner housing 22. Gases then flow through multiple orifices 22b in inner housing 22 into gas flow passage 23, charging the gas flow passage with a pressure which is slightly lower than the pressure within the inner housing 22. As the main gas generant burns, both P1 (internal housing pressure) and P2 (gas flow passage pressure) increase at the same rate and gases flow through the gas flow passage 23. Products from combustion of gas generant 28 proceed through inner housing gas exit apertures 22b into annular gas flow passage 23 and along passage 23 toward the downstream end of inner housing 22. While a portion of the combustion products exit inner housing 22 via exit apertures 22b, a portion of the combustion products also impinge on inner surfaces of inner housing 22, forcing the flow direction of the gases to change abruptly as they flow along the inner surfaces of the inner housing toward one of exit apertures 22b. Impinging of the gases upon the inner surfaces of inner housing 22 at a relatively high velocity causes the particulates to stick to or aggregate on the inner surfaces of inner housing 22.

Similarly, particulates passing through orifices 22b impact along inner surfaces of outer housing 12 prior to the gases changing direction as they flow along passage 23 toward orifices 30d. Impinging of the gases upon the inner surfaces of outer housing 12 at a relatively high velocity causes the particulates to stick to or aggregate on the inner surfaces of outer housing 12.

While a portion of the combustion products proceed through inner housing second end apertures 30d into chamber 30a, a portion of the combustion products also enter a portion 70 of the gas flow passage defined by an intersection or abutment of end portions of inner housing 22 and outer housing 12, forcing the flow direction of the gases to change abruptly as the gases flow back toward inner housing second end apertures 30d. Movement of the gases into passage portion 70 at a relatively high velocity causes the particulates to stick to or aggregate on surfaces with passage portion 70.

Gases proceed through inner housing second end apertures 30d into chamber 30a. Particulates remaining in the gas stream upon entering apertures 30d may impact along an exterior surface of annular sleeve 34b located substantially opposite orifice(s) 30d formed along inner housing 22, causing the particulates to stick to or aggregate on the exterior surface of the annular sleeve.

As seen in FIG. 1A, gases deflecting off of annular sleeve 34b are forced toward divider 30 in order to reach the hollow center portion of the sleeve leading to nozzle gas exit orifices 12e. Thus, particulates in the gases may also impact divider 30 and adhere thereto. Finally, gases proceeding toward nozzle orifices 12e may impact an inner end surface 12f of the nozzle, causing particulates to adhere thereto prior to exiting of the generated gas from orifices 12e.

As seen from the above description, a series of aggregation surfaces is positioned between the combustion chamber and exit apertures of the gas generating system to impart abrupt changes in velocity to the gas stream, thereby causing particulates suspended in the gas stream to impact the aggregation surfaces so as to adhere thereto. It is believed that a system of aggregation surfaces as described herein acts to trap most of the particulates produced during combustion of the gas generant, without the filter needed in other designs.

When the internal pressure in chamber 30a reaches a predetermined value, any burst seals positioned therein rupture, permitting gases to flow into the sleeve portion 34b, proceeding out of the gas generating system through nozzle 12d.

Figure 2:
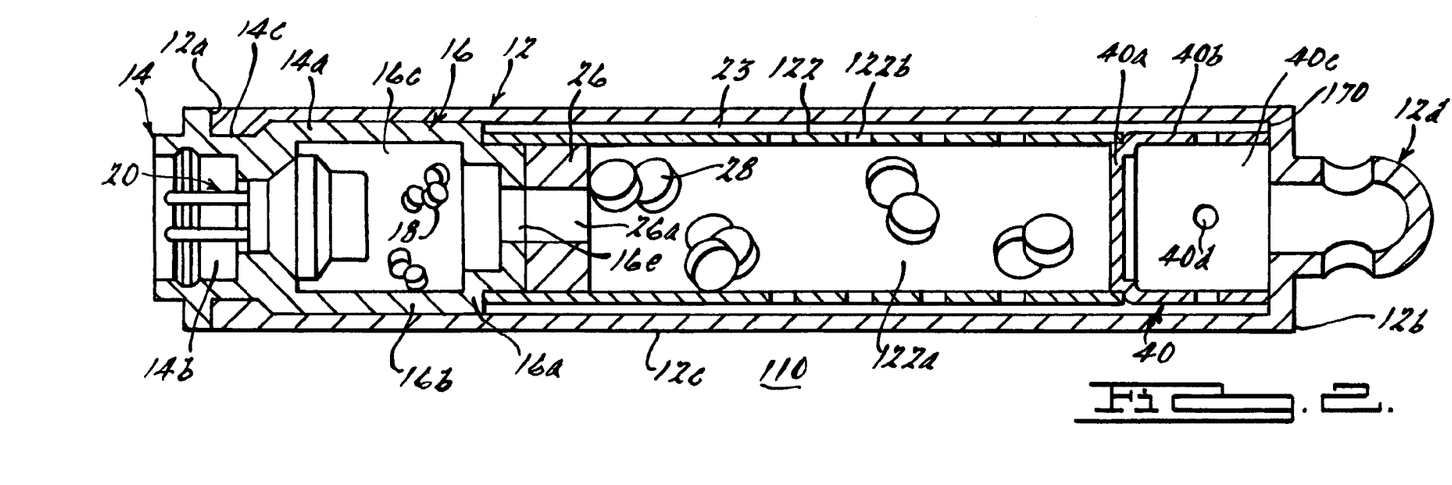
FIG. 2 is a cross-sectional side view of a second embodiment of a gas generating system in accordance with the present invention.
Figure 2A:
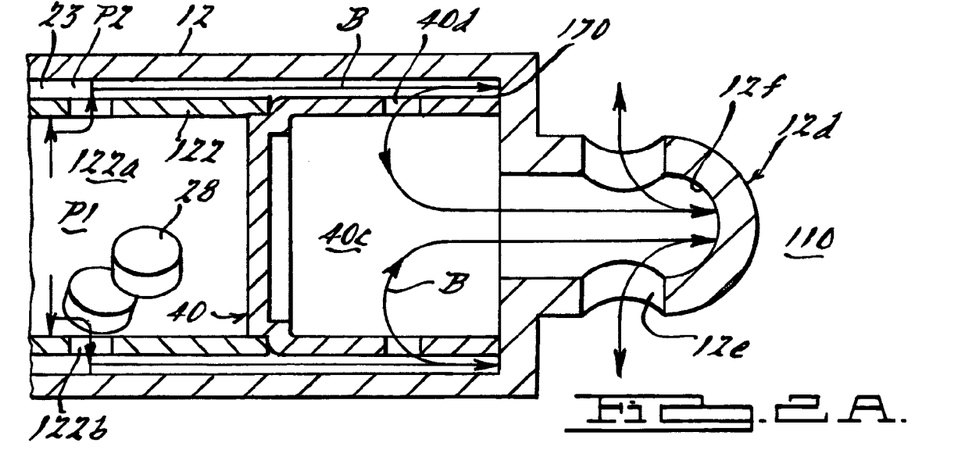
FIG. 2A is an enlarged view of a portion of FIG. 2 showing projected gas flow paths and projected particulate aggregation surfaces therealong.

Operation of the embodiment shown in FIGS. 2 and 2A is substantially identical to that described for the embodiment shown in FIGS. 1 and 1A, with gases from gas flow passage 23 proceeding along the path defined by arrows B, flowing through openings 40b into baffle chamber 40c, then into nozzle 12d, exiting the gas generating system through gas exit orifices 12e. While a portion of the combustion products proceed through inner housing second end apertures 30d into chamber 30a, a portion of the combustion products also enter a portion 170 of the gas flow passage defined by an intersection or abutment of end portions of inner baffle member 40 and outer housing 12, forcing the flow direction of the gases to change abruptly as the gases flow back toward baffle member apertures 40d. Movement of the gases into passage portion 170 at a relatively high velocity causes the particulates to stick to or aggregate on surfaces with passage portion 170.

In the process of the gases flowing out of the propellant body, into the gas flow passage 23, into the baffle member, then out of the gas exit nozzle 12d, all of the metal parts contacted by the gases and the tortuous path that the gases flow through provide cooling of the gases. This provides sufficient cooling of the gases so that no additional components (such as a heat sink device or a filter) are required. In addition, because additional cooling devices are not required, the gases provided by the consumed gas generant have an efficiency greater than those produced by existing gas generator system designs.

Figure 3:
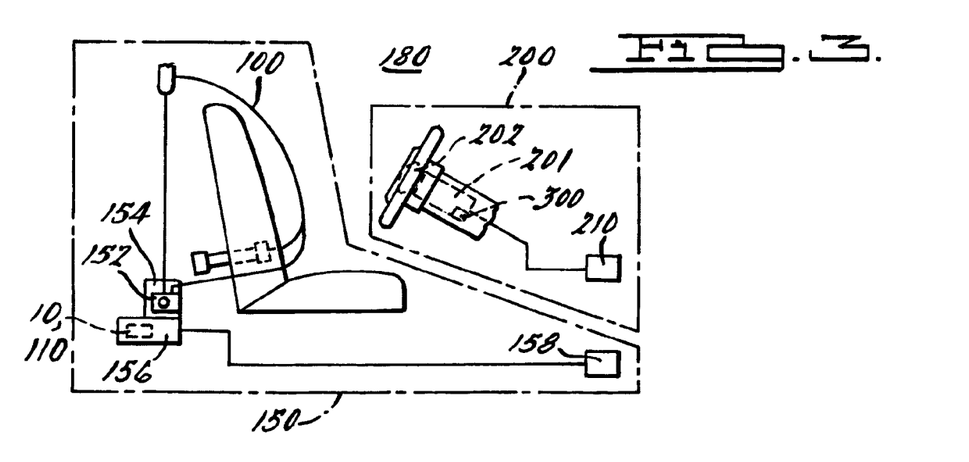
FIG. 3 is a schematic view of an exemplary gas generating system as employed in a vehicle occupant protection system, in accordance with the present invention.

Referring now to FIG. 3, an embodiment of the gas generating system 10 described above may also be incorporated into any of a variety of vehicle occupant protection system elements. In one example, the 20 mm diameter version of the gas generating system previously described is incorporated into a safety belt assembly 150 for pretensioning the safety belt.

FIG. 3 shows a schematic diagram of one exemplary embodiment of an exemplary safety belt assembly 150. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical gas-actuated pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) operates in conjunction with a crash sensor algorithm that signals actuation of belt pretensioner 156 via, for example, activation of igniter 20a (not shown in FIG. 3) incorporated into the gas generating system. U.S. Pat. Nos. 6,505,790 and 6,419,177, previously incorporated herein by reference, provide illustrative examples of pretensioners actuated in such a manner.

Referring again to FIG. 3, safety belt assembly 150 may also be incorporated into a broader, more comprehensive vehicle occupant restraint system 180 including additional elements such as an airbag system 200. Airbag system 200 includes at least one airbag 202 and a gas generating system 201 coupled to airbag 202 so as to enable fluid communication with an interior of the airbag. Airbag system 200 may also include (or be in communication with) a crash event sensor 210. Crash event sensor 210 operates in conjunction with a known crash sensor algorithm that signals actuation of airbag system 200 via, for example, activation of airbag gas generating system 10 in the event of a collision.

It should be appreciated that safety belt assembly 150, airbag system 200, and more broadly, vehicle occupant protection system 180 exemplify but do not limit uses of gas generating systems contemplated in accordance with the present invention. In addition, it should be appreciated that a gas generating system incorporating a plurality of particulate aggregation surfaces and a high gas-yield, low solids-producing gas generant composition as described herein may be used in the airbag system or in other vehicle occupant protection system elements requiring a gas generating system for operation.

In yet another aspect of the invention, a method of manufacturing an inflator may be described as follows:
1. Providing an outer housing having a first end and a second end, and a periphery.
2. Forming an outer protrusion, or annular flange, about the periphery at the first end.
3. Providing an end closure having a recessed portion, or a groove.

4. Inserting the end closure within the outer housing at the first end, thereby laterally aligning the outer protrusion and the recessed portion; and 5. Compressing the outer protrusion within the recessed portion. Compressing includes cold-working or otherwise metal-forming the coupling of the protrusion and recessed portion.

An inflator and a vehicle occupant protection system containing an inflator formed by the method described above are also included. The text describing the end closure 14 coupled to the first end 12*a* of housing 12, given above, is incorporated herein by reference, to fully inform the reader of the details of this method.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising:
   an outer housing including a combustion chamber, a first end, and a second end;
   an end closure coupled to the housing at said first end in a metal-to-metal seal;
   a smokeless gas generant composition positioned in the combustion chamber; and
   a baffle system including:
   a plurality of flow orifices defining a flow path for gases generated by combustion of the gas generant composition, the flow path extending between the combustion chamber and an exterior of the gas generating system, and a plurality of particulate aggregation surfaces positioned along the flow path of the gases for changing a flow direction of gases impinging on the aggregation surfaces, wherein particulates in gases impinging on the aggregation surfaces aggregate on the surfaces;
   an inner housing defining the combustion chamber, the inner housing being positioned with the outer housing to define a gas flow passage extending between the inner housing and the outer housing, the inner housing including at least one first orifice formed therealong to enable fluid communication between the combustion chamber and the gas flow passage;
   a baffle member defining a baffle member interior in fluid communication with the gas flow passage; and
   a nozzle in fluid communication with the baffle member interior and coupled to the outer housing, the nozzle having at least one gas exit orifice to enable fluid communication between an interior of the outer housing and an exterior of the outer housing,
   wherein the baffle member has an annular base portion and an annular sleeve extending from the base portion into the inner housing, the inner housing has at least one second orifice formed therealong opposite the annular sleeve to enable fluid communication between the gas flow passage and the baffle member interior, and wherein an aggregation surface of the plurality of aggregation surfaces is located along a surface of the annular sleeve extending opposite the at least one second orifice formed along the inner housing.

2. The gas generating system of claim 1 wherein each aggregation surface of the plurality of aggregation surfaces is oriented such that a difference between a flow direction of the gases prior to impinging on the aggregation surface and a flow direction of the gases after impinging on the aggregation surface is in the range of 90° to 180°.

3. The gas generating system of claim 1 wherein the gas generant composition comprises a mixture of:
   a high-nitrogen fuel selected from the class consisting of 1-, 3-, and 5-substituted nonmetal salts of triazoles, and, 1- and 5-substituted nonmetal salts of tetrazoles;
   a first oxidizer selected from the group consisting of phase stabilized ammonium nitrate;
   a metallic second oxidizer; and
   an inert component.

4. The gas generating system of claim 1 wherein the outer housing has an outer diameter of approximately 20 mm.

5. The gas generating system of claim 1 wherein the gas generant composition is a smokeless gas generant composition.

6. The gas generating system of claim 1 wherein to gas generant composition comprises a mixture of
   a high-nitrogen fuel selected from the class consisting of 1-, 3-, 5-substituted amine salts of triazoles and 1- and 5-substituted amine salts of tetrazoles, said fuel employed in a concentration of 13 to 38% by weight of the gas generant composition;
   a first oxidizer consisting of phase stabilized ammonium nitrate, said first oxidizer employed in a concentration of 46 to 87% by weight of the gas generant composition;
   a metallic second oxidizer employed in a concentration of 0.1 to 25% by weight of the gas generant composition; and
   an inert component employed in a concentration of 0.1 to 8% by weight of the gas generant composition, wherein said fuel is selected from the group consisting of monoguanidinium salt of 5,5'-Bi-1H-tetrazole, diguanidinium salt of 5,5'-Bi-1H-tetrazole, monoaminoguanidinium salt of 5,5'-Bi-1H-tetrazole, diaminoguanidinium salt of 5,5'-Bi-1H-tetrazole monohydrazinium salt of 5,5'-Bi-1H-tetrazole, dihydrazinium salt of 5,5'-Bi-1H-tetrazole, monoammonium salt of 5,5'-Bi-1H-tetrazole, diammonium salt of 5,5'-Bi-1H-tetrazole, mono-3-amino-1,2,4-triazolium salt of 5,5'-Bi-1U-tetrazole, di-3-amino-1,2,4-triazolium salt of 5,5'-Bi-1H-tetrazole, diguanidinium salt of 5,5'-Azobis-1H-tetrazole, and monoammonium salt of 5-Nitramino-1H-tetrazole.

7. The gas generating system of claim 1 wherein the gas generant composition comprises a mixture of a high-nitrogen nonazide fuel selected from the class consisting of 1-, 3-, and 5-substituted amine salts of triazoles, and, 1- and 5-substituted amine salts of tetrazoles; and dry-mixed with an oxidizer selected from the group consisting of phase stabilized ammonium nitrate.

8. The gas generating system of claim 1 wherein the gas generant composition comprises a mixture of:
   a high-nitrogen nonazide fuel selected from the class consisting of 1-, 3-, 5-substituted amine salts of triazoles and 1- and 5-substituted amine salts of tetrazoles, said fuel employed in a concentration of 15 to 65% by weight of the gas generant composition; and
   an oxidizer consisting of phase stabilized ammonium nitrate, said oxidizer employed in a concentration of 35 to 85% by weight of the gas generant composition,
   wherein said fuel is selected from the group consisting of monoguanidinium salt of 5,5'-Bis-1H-tetrazole, diguanidinium salt of 5,5'-Bis-1H-tetrazole, monoaminoguanidinium salt of 5,5'-Bis-1H-tetrazole, diaminoguanidinium salt of 5,5'-Bis-1H-tetrazole, monohydrazinium salt of 5,5'-Bis-1H-tetrazole, dihydrazinium salt of 5,5'-Bis-1H-tetrazole, monoammonium salt of 5,5'-bis-1H-tetrazole, diammonium salt of 5,5'-bis-1H-tetrazole, mono-3-amino-1,2,4-triazolium salt of 5,5'-bis-1H-tetrazole, di-3-amino-1,2,4-triazolium salt of 5,5'-bis-1H-tetrazole, diguanidinium salt of 5,5'-Azo-bis-1H-tetrazole, and monoammonium salt of 5-Nitramino-1H-tetrazole.

9. The gas generating system of claim 1 wherein the gas generating system is a filterless gas generating system.

10. A vehicle occupant protection system including a gas generating system in accordance with claim 1.

11. The vehicle occupant protection system of claim 10 wherein the outer housing has a diameter of about 20 millimeters.

12. The gas generating system of claim 1 wherein
the end closure haying has a recessed portion with a cross-sectional shape, and wherein the outer housing includes a portion having material cold-worked so as to plastically flow into the end closure recessed portion so as to conform to the cross-sectional shape of the recessed portion to form the metal-to-metal seal between the housing and the end closure.

13. A method of manufacturing a gas generating system in accordance with claim 12, the method comprising the steps of:
providing the outer housing, the outer housing including a periphery;
farming an outer protrusion about the periphery at the first end;
providing the end closure
inserting the end closure within the outer housing at the first end, thereby laterally
aligning the outer protrusion and the recessed portion; and
compressing the material of the outer protrusion into the recessed portion such that the material of the outer protrusion plastically flows into the recessed portion so as to conform to the cross-sectional shape of the recessed portion, thereby forming a metal-to-metal seal between the outer housing and the end closure.

* * * * *

UNITED STATES PATENT AND TRADEMARK OFFICE
CERTIFICATE OF CORRECTION

PATENT NO. : 7,654,565 B2  Page 1 of 1
APPLICATION NO. : 11/445859
DATED : February 2, 2010
INVENTOR(S) : McCormick et al.

It is certified that error appears in the above-identified patent and that said Letters Patent is hereby corrected as shown below:

Column 12; Line 19; Claim 6; delete "to" and insert --the--.

Column 12; Line 20; Claim 6; after of insert --:--.

Column 12; Line 42; Claim 6; delete "1U" and insert --1H--.

Column 13; Line 18; Claim 12; delete "haying".

Column 14; Line 9; Claim 13; delete "farming" and insert --forming--.

Signed and Sealed this

First Day of June, 2010

David J. Kappos
*Director of the United States Patent and Trademark Office*